United States Patent [19]
Roby

[11] Patent Number: 5,826,867
[45] Date of Patent: Oct. 27, 1998

[54] MECHANICAL FLY TYING DEVICE

[76] Inventor: Stanley M. Roby, 866 Roosevelt St., Hazleton, Pa. 18201

[21] Appl. No.: 788,452

[22] Filed: Jan. 29, 1997

[51] Int. Cl.⁶ ...................................................... B25B 1/22
[52] U.S. Cl. .............................................. 269/75; 269/74
[58] Field of Search .................................. 269/75, 71, 74, 269/78, 907

[56] References Cited

U.S. PATENT DOCUMENTS

| | | | |
|---|---|---|---|
| 2,586,636 | 2/1952 | Fischer et al. | 269/71 |
| 3,945,631 | 3/1976 | Sander | 269/131 |
| 4,039,178 | 8/1977 | Odames | 269/75 |
| 4,134,577 | 1/1979 | Price et al. | 269/71 |
| 4,169,562 | 10/1979 | Renzetti | 242/7.01 |
| 4,214,739 | 7/1980 | Dailey | 269/75 |
| 5,169,079 | 12/1992 | Renzetti | 242/7.19 |

FOREIGN PATENT DOCUMENTS 197808  8/1978  United Kingdom ..................... 269/75

Primary Examiner—David A. Scherbel
Assistant Examiner—Lee Wilson
Attorney, Agent, or Firm—Anthony J. Dixon

[57] ABSTRACT

A mechanical vise for holding fish hooks of various sizes while tying various imitation insect patterns thereon for use in the sport of fly fishing wherein the fish hooks are held in the teeth of the chuck which in turn can be removed or spun on a shaft connected to the base of the vise by a ball joint whereby a multiplicity of positions is achievable to allow complete access to the fly being provided and wherein material is held by a spring to allow the user complete freedom in applying said material to the hook and wherein additional hooks are stored on a magnetic pad mounted to the base.

3 Claims, 1 Drawing Sheet

5,826,867

MECHANICAL FLY TYING DEVICE

BACKGROUND OF THE INVENTION

1. Field of the Invention

The present invention relates to the field of mechanical vises. More particularly, it relates to the field of mechanical vises for the holding of fish hooks while tying various imitation insect patterns for use in the sport of fly fishing.

2. The Prior Art

The art of tying imitation insect patterns or flies to be used in the sport of fly fishing is an old art. Well before the days of Isaac Walton, man has attempted to fool fish with the use of imitation flies. In order to effectively tie flies, one must be able to secure the hook on which the fly must be tied in a fastener where it is accessible to the fly tier yet secure to allow for firm wrapping of materials such as thread, foil, yarn, wool, feathers and the like thereon. If the hook is not secure the product will not be tightly tied and proceed so as to withstand the rigors of fly fishing.

This problem in the art has been addressed in many ways and various sophisticated types of vises are known in the market place; however, the need exists for a simple, portable and inexpensive vise to be used by the average fisherman or fly tier.

This is the need that is addressed by the present invention.

SUMMARY OF THE INVENTION

It is therefore an object of the present invention to provide a mechanical vise for the holding of fish hooks while tying various imitation insect patterns thereon for use in the sport of fly fishing.

The present device encompasses:
a. base of a weight sufficient to hold the device in place;
b. a socket defined in the base;
c. a shaft with three (3) sections, a ball section with a ball accommodatingly smaller than the socket to provide compound articulation for the tying process, a middle section with an offset and a top horizontal section;
d. tension means mounted in the socket and engaged by the ball;
e. a pin mounted in the top section of the shaft;
f. an adjustable chuck in which a hook can be held;
g. means for slidingly mounting the chuck on the horizontal section whereon it can rotate or be anchored in position by engaging the pin;
h. means for engaging the chuck to the pin;
i. holder means circumferentially mounted on a chuck whereby material can be held in place thus allowing a clear tying area; and
j. magnetic pad for holding a supply of hooks.

The notch of the ball in the socket allows the user to move the entire shaft in an unlimited number of positions so that the chuck can be positioned to suit the user of the vise. Further, the ability of the chuck to rotate on the top horizontal shaft section allows for spinning the chuck and the hook thereon to apply thread or material thereto. The removability of the entire chuck section allows for the ease of trimming and other access to the finished fly held thereon.

These and other objects and advantages will be more readily apparent on review of the drawing and the description of the preferred embodiement which follows.

DESCRIPTION OF THE PREFERRED EMBODIEMENT

Figure 1:
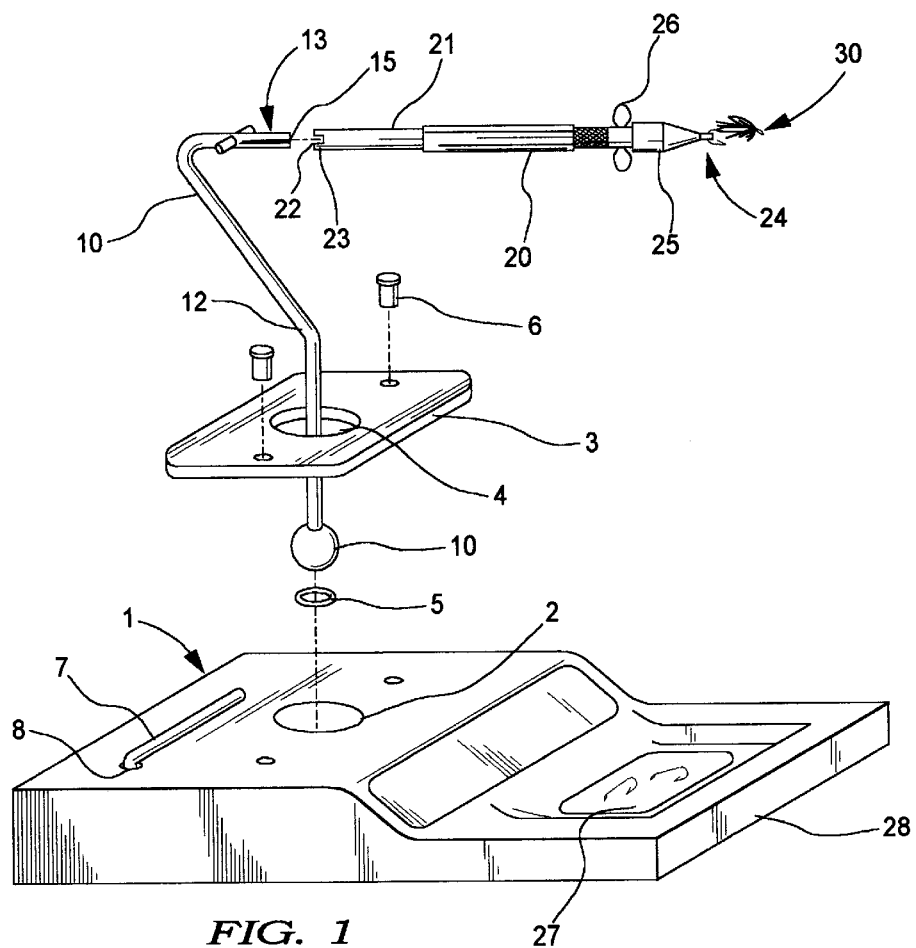
FIG. 1 is a view of the device of the present invention which also illustrates a removable chuck assembly.

Referring to FIG. 1, the complete device of the present invention can be seen. The vise is mounted on a base, 1, wherein a socket, 2, is defined. Within this socket is a tension washer, 5, which resists the insertion of ball, 11. Over the socket is plate, 3, which is fastened by allen screws or fasteners, 6. A wrench, 7, for tightening these screws, 6, is mounted in wrench holder, 8. The shaft, 10, with ball end, 11, is inserted into the socket, 2, and plate, 3, is mounted thereover. The aperture, 4, in plate, 3, is slightly smaller in dimension than the ball, 11, so that tightening plate, 3, to base, 1, forces ball end, 11, against tension washer. 5, which is a split ring type which resists compression. The tightening causes the rotation on spinning of ball, 11, in socket, 2, to be stiffer. A loose plate will not hold the shaft, 10, in a vertical position. A complete tightening will essentially fix ball, 11, and thereby the shaft, 10, in a fixed position. A snug tightening will allow ball, 11, to rotate universally thereby rotating the shaft, 10, and its horizontal end, 13, mounted on the other end of the offset shaft, 12. In this fashion, the horizontal end, 13, can be placed in an infinite number of positions (compound articulation) for the user's comfort. The offset, 12, allows the underside of end, 13, to be fully accessible. Complete removal of the entire shaft, 10, provides ease of portability of the vise.

Mounted on the base, 1, is a pad, 27, which is magnetized so that a supply of hooks can be kept without losing them. In this way, the user can set out the number of hooks he intends to use and have them readily accessible to tie one fly after another. It should be noted that an accomplished tier will complete a simple fly pattern in less than two and one-half (2½) minutes and will tie over two (2) dozen in an hour.

Figure 2:
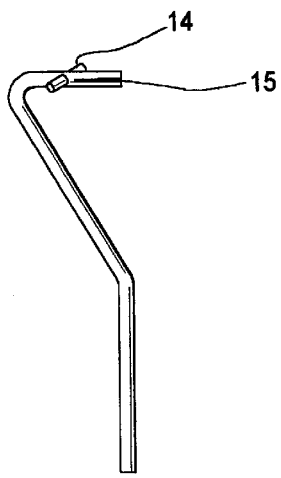
FIG. 2 is a separate view of the chuck connection.

The horizontal section, 13, is split at location, 15, so as to provide a spring type insert end. Pin, 14, is mounted radially through the shaft, 13, and receives the slot, 22, in the chuck, 20, which slides over the shaft, 13. Note FIG. 2.

The chuck has an adapter section, 21, which has an interior aperture, 23, which slides over shaft, 13. The split, 15, in shaft, 13, results in a spring like pressure outwards within aperture, 23. The outward force caused by compression of split, 15, is sufficient to hold adapter, 21, and thereby chuck, 20, in position but still allow the adapter, 21, to spin on top section, 13. Complete insertion of top section, 13, into aperture, 23, results in pin, 14, engaging slot, 22, defined in the end of adapter, 21. When complete engagement is achieved, the adapter, 21, and thereby the entire chuck mechanism, 20, is fixed in position. It is envisioned that a series of chucks of various sizes can be interchangeably mounted on the device to allow for hooks of various sizes.

The chuck mechanism, 20, is attached to adapter, 21. The chuck comprises a face, 24, with opposing teeth, which once tightened together by the tightening of screw type adjustor, 25, in the fashion of a standard chuck mechanism as is long known in the mechanical arts as a gripping device of opposing tightening teeth for handling or holding a work piece, in this case, a fish hook, 30, to which will be applied an imitation insect pattern or design.

Circumferentially mounted to the chuck, 20, is holder means, 26, in a location immediately adjacent to the chuck face. This is a spring in the preferred embodiment and serves the function of providing a holder for material being applied to the hook, 30. One end of the material is attached to the hook by standard thread wrapping and the other end is inserted into the spring whereby it is held in a postion parallel to the shank of the hook, 30. In this way, the user can work on attaching material without the need to hold the loose end thereof which enchances the ability of the user to apply more than one material by acting as essentially an extra hand.

Mounted to the base, 1, is magnetic pad, 27, over the top thereof and another bottom pad, 28, which is made of cork, rubber or the like to provide a higher coefficient of friction between the base, 1, and the surface upon which it is placed. It also serves to protect the surface upon which it is placed from marring by the base, 1.

By removal of the shaft, 10, from base, 1, and removal of chuck from shaft, 10, the entire vise can be compacted to allow for ease of portability or storage. The simplicity of the unit and the small amount of moving parts provides for trouble free and low maintenance over a long period of time in many environments such as stream side where repairs would be inconvenient at best.

The base is constructed of machined and painted cast iron and measures about 3½" by 6" in length. The shaft extends to a height of about 6" above the base which is sufficient room in view of the offset shaft, 12, to allow most users to have a comfortable device to use.

In actual use, the user places the base, 1, on a convenient surface, such as a table or bench (not shown). The shaft, 10, is passed through the aperture in plate, 3, and ball, 11, is inserted into socket, 2. The plate, 3, is fastened to base, 1, via connectors or fasteners, 6, which are tightened by wrench, 7, to a point that the ball is secure but can be rotated within the socket, 2, against spring means, 11. A suitable chuck, 20, with adapter, 21, attached is slidingly mounted to top section, 13, until the slot, 22, engages pin, 14. The shaft is then rotated or tilted to a position selected by the user.

A hook, 30, is engaged by the chuck face, 24, which is typical vise screw type adjuster, 25. A chuck of this type is produced by standard tool makers and is readily available in the market place.

Material is then attached to the hook in the manner of fly tying with the loose end held for the user by means of spring holder, 26. Upon completion, the chuck is loosened and the completed fly removed. The next hook is removed from magnetic pad, 27, inserted into chuck, 20, and the process repeated.

What is provided is a single, inexpensive, mechanical vise for holding hooks, 30, while tying various imitation insect patterns for use in the sport of fly fishing. It is adjustable to an infinite number of positions and is easily disassembled and reassembled providing ease of portability.

Although the preferred embodiment has been disclosed herein, it is anticipated that the device of the present invention may be modified without departing from the scope and principles set forth herein.

I claim:

1. A mechanical vise for the holding of fish hooks and providing compound articulation thereof while tying imitation insect patterns by application of fly tying materials thereto for use in the sport of fly fishing comprising:

a. a base of weight sufficient to hold the vise in place;

b. a socket defined in the base;

c. tension means inserted into the socket;

d. a shaft with three sections, a bottom ball section sized proportionately smaller than the socket, a middle offset section and a top horizontal section, the ball section inserted into the socket;

e. means for retaining the ball section in the socket thereby engaging the tension means;

f. a pin mounted into the top horizontal section;

g. an adjustable and removable chuck which holds the fish hook;

h. means for slidingly mounting the chuck to the top horizontal section;

i. means for engaging the means the means for slidingly mounting the chuck of to the pin;

j. means mounted on the chuck for holding the material being applied to the fish hook;

k. means for holding a supply of fish hooks by magnetic action, said means attached to the base;

whereby a fish hook can be held in a fixed position to allow for material to be applied thereto to create an imitation insect pattern thereon.

2. The mechanical vise of claim 1 wherein the means for retaining the ball section in the socket is a plate mounted to the base with an aperture defined therein smaller than the ball section whereby tightening of the plate forces the ball section against the tension means and wherein means for rotationally mounting the chuck to the shaft top horizontal section is a cylindrical adapter fixed to the chuck on one end and having a central interior aperture in the other end of the adapter accommodatingly larger than the top shaft horizontal section whereby the shaft top horizontal section is inserted into the aperture.

3. The mechanical vise of claim 2 wherein the means for engaging the cylindrical adapter to the pin is a slot defined in the central aperture end of the cylindrical adapter and wherein means for holding the material being applied to the fish hook is a spring circumferentially mounted to the chuck into which fly tying materials may be inserted and held in place by the tension of the spring.

* * * * *